US009281897B2

(12) United States Patent
Dispenza et al.

(10) Patent No.: US 9,281,897 B2
(45) Date of Patent: Mar. 8, 2016

(54) ELECTRO-OPTICAL SINGLE-SIDEBAND MODULATOR

(71) Applicant: Selex Sistemi Integrati S.p.A., Rome (IT)

(72) Inventors: Massimiliano Dispenza, Rome (IT); Alberto Secchi, Rome (IT); Massimo Ricci, Rome (IT); Stefano Casagrande, Rome (IT); Andrea Evangelisti, Rome (IT); Fabio Della Rovere, Rome (IT)

(73) Assignee: Selex Sistemi Integrati S.p.A., Rome (IT)

( * ) Notice: Subject to any disclaimer, the term of this patent is extended or adjusted under 35 U.S.C. 154(b) by 58 days.

(21) Appl. No.: 13/690,348

(22) Filed: Nov. 30, 2012

(65) Prior Publication Data

US 2013/0142521 A1 Jun. 6, 2013

(30) Foreign Application Priority Data

Dec. 2, 2011 (IT) .............................. TO2011A1109

(51) Int. Cl.
*H04B 10/04* (2006.01)
*H04B 10/50* (2013.01)
*G02F 1/313* (2006.01)
*H04B 10/516* (2013.01)
*G02F 1/035* (2006.01)

(52) U.S. Cl.
CPC ............ *H04B 10/501* (2013.01); *G02F 1/3134* (2013.01); *G02F 1/0356* (2013.01); *G02F 2201/05* (2013.01); *H04B 10/5165* (2013.01)

(58) Field of Classification Search
CPC ................................................. H04B 10/5165
See application file for complete search history.

(56) References Cited

U.S. PATENT DOCUMENTS

| 4,940,305 | A | * | 7/1990 | Thaniyavarn | ......... | G02F 1/3132 385/16 |
| 5,022,731 | A | * | 6/1991 | Maerfeld | ................... | G02F 2/02 359/332 |
| 5,146,518 | A | * | 9/1992 | Mak | ....................... | G02F 1/3133 385/11 |
| 6,141,141 | A | * | 10/2000 | Wood | ........................ | G02F 2/02 359/326 |
| 8,606,054 | B2 | * | 12/2013 | Dispenza | ................ | G02F 1/225 29/825 |

(Continued)

OTHER PUBLICATIONS

Letokhov et al., Laser Science and Technology and International Handbook, vol. 20, 1995, Harwood Academic Publishers, p. 9-10.*

(Continued)

*Primary Examiner* — Ken Vanderpuye
*Assistant Examiner* — Jai Lee
(74) *Attorney, Agent, or Firm* — Marshall, Gerstein & Borun LLP

(57) ABSTRACT

An electro-optical single-sideband modulator comprising:
an electro-optical substrate;
a bimodal optical waveguide structure formed in the substrate to support different optical modes having associated optical frequencies and optical propagation constants and comprising an optical input to receive an input optical carrier signal having an optical frequency, and a pair of optical outputs to output corresponding SSB modulated optical signals, each having an optical frequency spectrum with a single side lobe; and
an electrode structure formed on the substrate to receive an input electrical modulating signal having an associated electrical frequency and electrical propagation constant, and to responsively apply an electrical field to the bimodal optical waveguide structure.

9 Claims, 3 Drawing Sheets

(56) References Cited

U.S. PATENT DOCUMENTS

2003/0002766 A1* 1/2003 Pruneri .................. G02F 1/225
385/2
2011/0150387 A1* 6/2011 Pierno .................. G02F 1/3137
385/14

OTHER PUBLICATIONS

Nair et al., Solid State Devices, 2010, PHI Learning Private Limited, pp. 34-35.*

Desormiere et al., An Integrated Optic Frequency Translator for Microwave Lightwave Systems, 1990, IEEE.*

Désormière, B., et al., "An Integrated Optic Frequency Translator for Microwave Lightwave Systems," *Journal of Lightwave Technology*, vol. 8, No. 4, pp. 506-513, Apr. 1990.

Breuil, N., et al., New Optical Modulation Schemes Applied to Local Oscillator Distribution in Radar Systems, Microwave Photonics, International Topical Meeting on Microwave Photonics, *IEEE*, Ogunquit, Maine, Oct. 4-6, 2004, pp. 119-122.

Italian Search Report in Italian Application No. IT T020111109, dated Jul. 13, 2012.

* cited by examiner

ELECTRO-OPTICAL SINGLE-SIDEBAND MODULATOR

CROSS-REFERENCE TO RELATED APPLICATIONS

This application claims the benefit of Italian Patent Application No.: TO2011A 001109, filed Dec. 2, 2011.

TECHNICAL FIELD OF THE INVENTION

The present invention relates in general to electro-optical modulators, and in particular to electro-optical single-sideband modulators (EOSSBMs).

BACKGROUND ART

As is known, electro-optical modulators are crucial optical components for optical digital and analog links for signal transmission and processing, in that they are capable of modulating optical power of optical carriers by means of driving electrical signals.

EOSSBMs are especially useful in optical fiber communication systems, such as higher density wavelength multiplexing and long-haul fiber transmission due to reduced non-linear optical effects, because of reduced optical power.

The presence of a single side lobe in the optical spectrum of a SSB-modulated optical signal results in several technical advantages, the main of which are half spectral occupation compared to standard Double SideBand (DSB) modulation and no fading of the optical signal at the end of an optical link when used fiber optics are dispersive.

On the other hand, EOSSBMs are usually quite complex in their internal configuration, in their operation, and in the external drivers needed for their operation.

A known Mach-Zehnder (MZ)-type EOSSBM is disclosed in Higuma, K., Hashimoto, Y., Nagata, H., Oikawa, S., Izutsu, M., "*X-cut LiNbO3 optical SSB modulators*", Electronics Letters Vol. 37 (2001), pp. 515-516 and schematically depicted in FIG. 1.

The EOSSBM is formed in an LiNbO3, X-Cut, Y-propagation substrate and includes a primary, nested MZ structure made up of two optical, Ti-diffused, MZ waveguide paths each including a sub-MZ structure $MZ_A$, $MZ_B$. Two RF modulation ports $RF_A$ and $RF_B$ and three DC bias ports $DC_A$, $DC_B$ and $DC_C$ are provided.

A DC supply is supplied to the sub-structure $MZ_A$ from bias port $DC_A$ to result in a π phase shift between the two sub-arms in sub-structure $MZ_A$, to sub-structure $MZ_B$ from bias port $DC_B$ to result in a π phase shift between the two sub-arms in sub-structure $MZ_B$, and to primary structure MZ from bias port $DC_C$ to result in a π/2 phase shift between sub-structures $MZ_A$ and $MZ_B$. An RF modulation signal $\Phi_1(t) = \Phi \cdot \cos \Omega t$ is supplied to sub-structure $MZ_A$ from modulation port $RF_A$, and an RF modulation signal $\Phi_2(t) = \Phi \cdot \sin \Omega t$ is supplied to sub-structure $MZ_B$ from modulation port $RF_B$ and generated by a wideband 90-degrees phase shifter inputted with $\Phi_1(t)$.

Despite its undeniable performance in terms of carrier suppression ratio, it is equally undeniable that this EOSSBM is everything but simple: in fact, two levels of nested MZ modulators in the optical pattern are provided, three DC bias signals are needed during operation with proper electronic stabilization loops, and two different, π/2 shifted, RF driving signals are needed.

A more standard configuration of a known MZ-type EOSSBM is disclosed in Smith, G. H., Novak, D., Ahmed, Z., "*Technique for optical SSB generation to overcome dispersion penalties in fibre-radio systems*" Electronics Letters Vol. 33 (1997), pp. 74-75 and schematically depicted in FIG. 2.

Despite a single MZ modulator is featured, a proper DC bias point stabilization together with wideband processing of the RF modulating signal is still needed, which includes signal splitting and π/2 phase shifting of one of the two split signals.

U.S. Pat. No. 5,022,731 discloses (FIG. 12) a frequency shifter which can be employed in a EOSSBM device operable to transmit a signal V(t) by heterodyning between two optical signals. To this end, a laser source is employed, which emits a substantially monochromatic optical signal at an optical frequency. The optical signal is divided into two in order to excite two input optical fibers in equal manner, wherein a first one of the input optical fibers is connected to a frequency shifter which receives an electric signal $V(t)e^{j2\pi ft}$. The optical frequency-shifted signal is transferred to an output optical fiber. The optical signal from the laser source and supplied to the second one of the two input optical fiber is combined to the frequency-shifted optical signal. From this point on, the optical spectrum of the resulting optical signal is that of an SSB-modulated optical signal. Nevertheless, this approach to implement SSB modulation clearly looks quite complex in term of optical circuit with two nested MZ-like structures, the one made up with optical fibers also being potentially affected by large thermo-mechanical instability and fluctuations. Also a proper DC bias point stabilization is still needed.

In this architecture, as well as in the others mentioned above, at each recombination Y junction a partial destructive interference effect occurs, thus causing part of optical power being lost in radiative modes.

OBJECT AND SUMMARY OF THE INVENTION

The objective of present invention is hence to provide an EOSSBM which is simpler in terms of both overall optical pattern and DC supply and RF signal pre-processing.

This objective is achieved by the present invention in that it relates to an electro-optical single-sideband modulator comprising:

an electro-optical substrate;

a bimodal optical waveguide structure formed in the substrate to support different optical modes having associated optical frequencies and optical propagation constants and comprising an optical input to receive an input optical carrier signal having an optical frequency, and a pair of optical outputs to output corresponding SSB modulated optical signals, each having an optical frequency spectrum with a single side lobe; and an electrode structure formed on the substrate to receive an input electrical modulating signal having an associated electrical frequency and electrical propagation constant, and to responsively apply an electrical field to the bimodal optical waveguide structure;

wherein the bimodal optical waveguide structure and the electrode structure are so formed that the optical propagation of the optical modes and the electrical propagation constant of the electrical modulating signal meet a Phase Matching condition, according to which the optical propagation constant of a first one of the optical modes is equal to the sum of the optical propagation constant of a second one of the optical modes and the electrical propagation constant of the electrical modulating signal, so resulting in the energy of the first optical mode being transferred at least partially to the second optical mode, and, as a consequence, in the optical frequency ($\omega_A$) of the second optical mode being equal to the optical frequency ($\omega_S$) of the first optical mode up-shifted of the electrical frequency of the electrical modulating signal.

In broad outline, unlike the MZ-based approach adopted in the EOSSBMs of the prior art, where a proper phase relation is exploited between two $\pi/2$ phase shifted modulating signals which simultaneously modulate the same optical carrier signal, and then the resulting two DSB modulated optical signals are caused to interfere to result in the unwanted side lobes being cancelled, the present invention is not based on a MZ approach and causes directly a simple shift of the incoming optical spectrum, with a small amount of shifted power and a large residual unshifted carrier.

BRIEF DESCRIPTION OF THE DRAWINGS

For a better understanding of the present invention, a preferred, non-limitative embodiment, which is intended purely by way of example and is not to be construed as limiting, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

Figure 1:
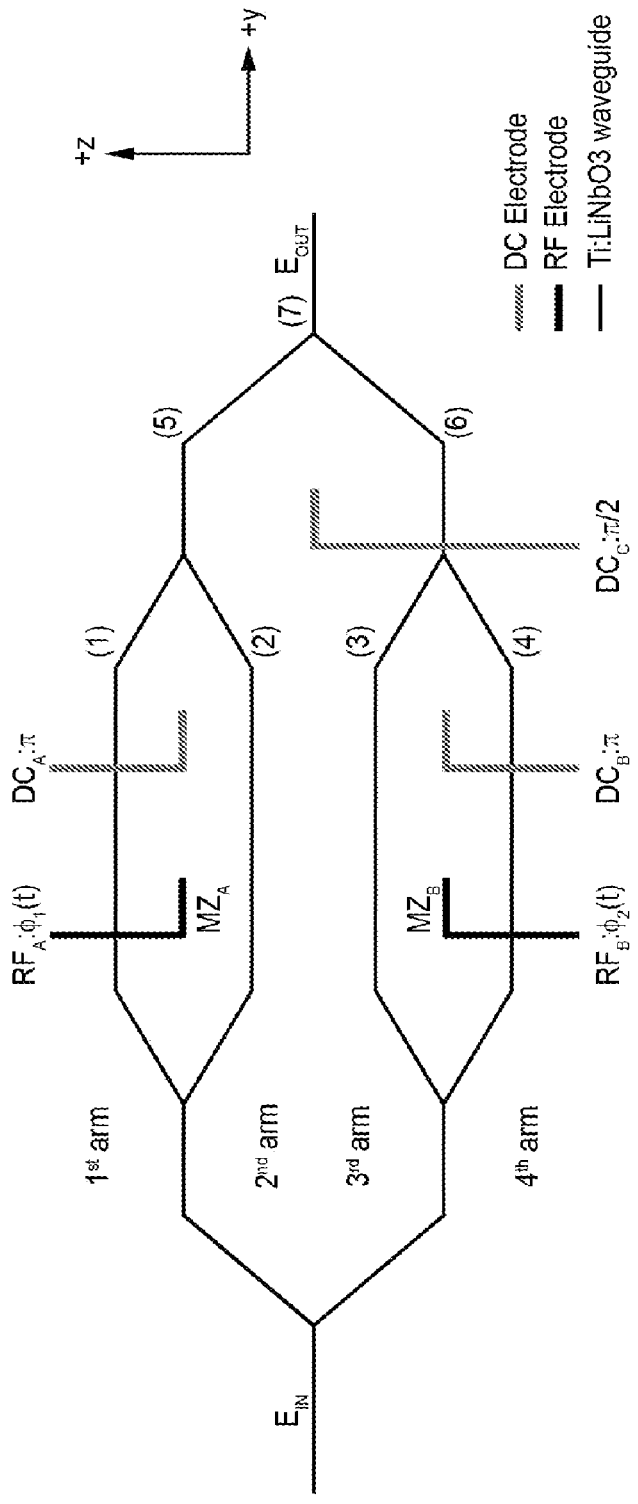
FIGS. 1 and 2 schematically depict known MZ-type EOSSBMs.
Figure 2:
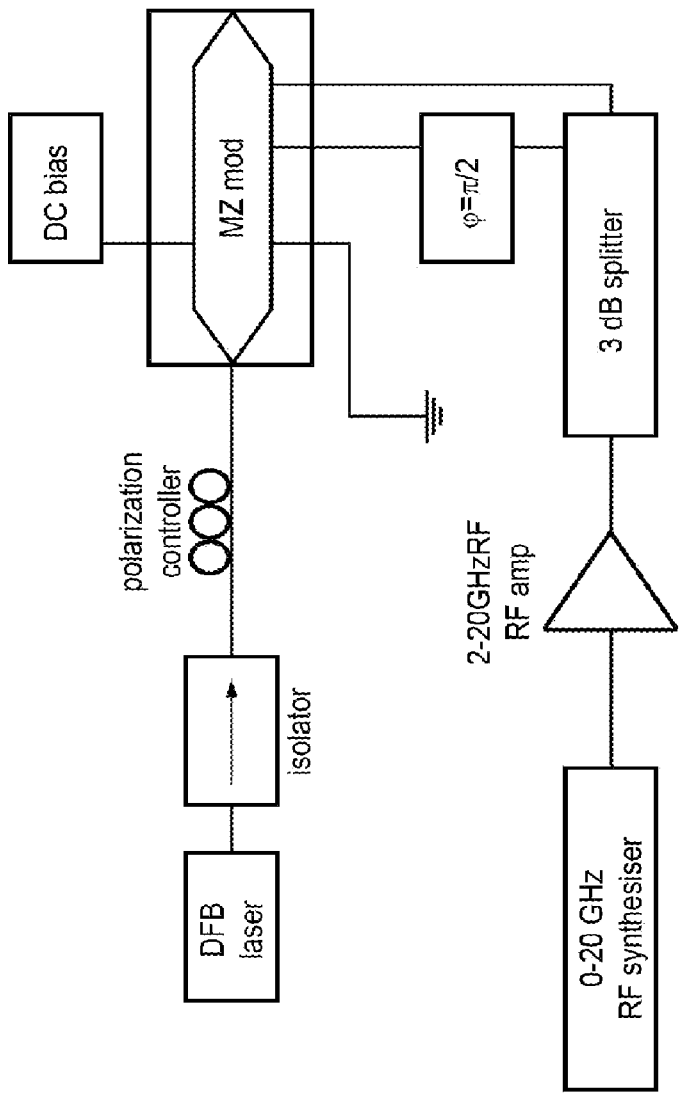
Figure 3:
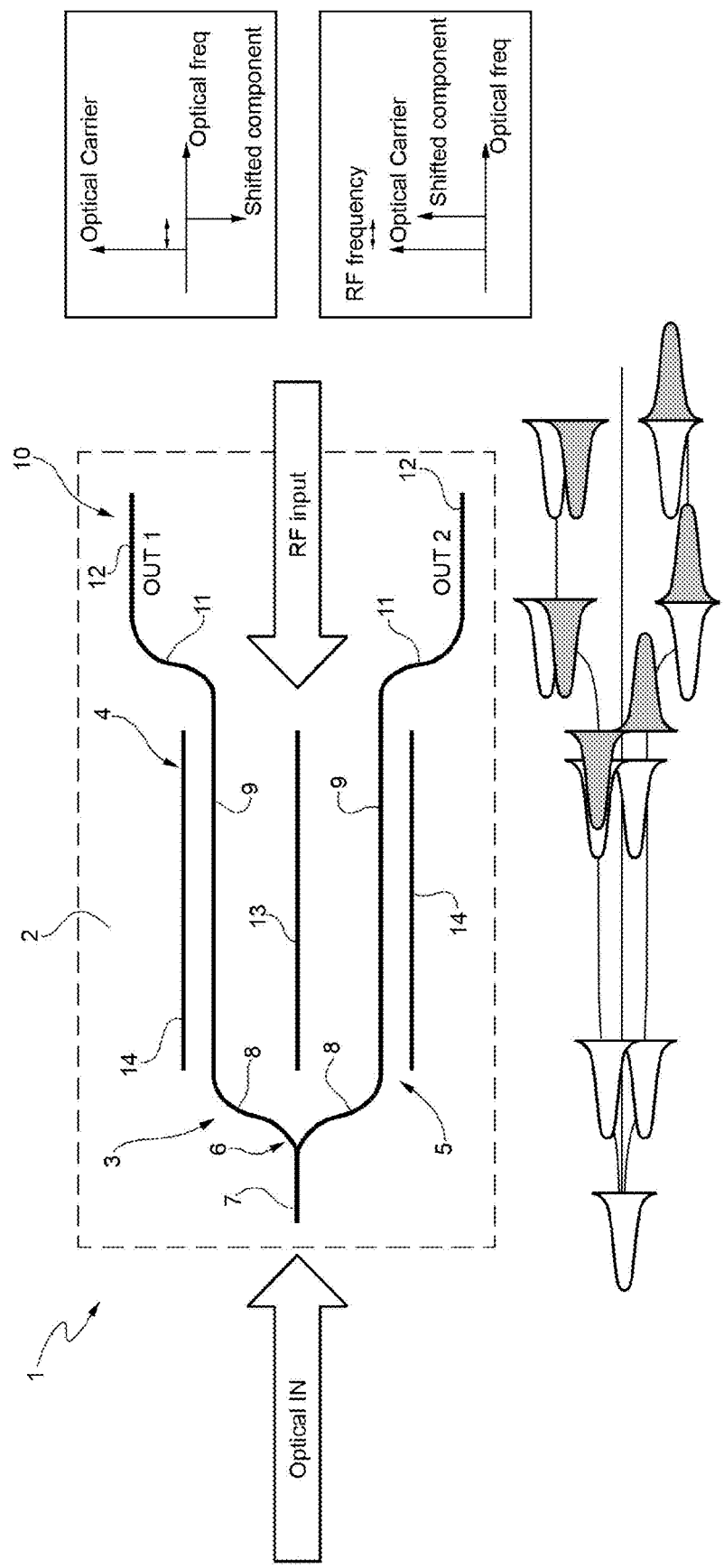
FIG. 3 schematically depicts an EOSSBM according to the present invention.

An EOSSBM according to the present invention is schematically depicted in FIG. 3 and generally referenced by reference numeral 1.

EOSSBM 1 basically includes:
an electro-optical substrate 2, conveniently an X-cut LiNbO$_3$ substrate (other suitable electro-optical materials, different from LiNbO$_3$ but still endowed with electro-optical properties, may be LiTaO$_3$, KTP, GaAs, etc.);
a bimodal optical waveguide structure 3 formed in the substrate 2 in a conventional manner, for example by selectively diffusing Ti into the substrate 2, to receive an input optical carrier signal to be SSB modulated and having an optical frequency $\omega_S$; and
an electrode structure 4 formed on the substrate to receive an input electrical RF modulating signal with an electrical frequency $\Omega$ and an electrical propagation constant $\beta_\Omega$, and responsively apply an electrical field to the optical waveguide structure.

The bimodal optical waveguide structure 3 comprises:
an optical input IN to receive the input optical carrier signal, and a pair of optical outputs OUT1 and OUT2 to output corresponding SSB modulated optical signals, each having an optical frequency spectrum with a single side lobe;
an input section 5 including:
a beam splitter 6, which is in the form of an Y junction, and which includes an input waveguide 7 connected to the optical input IN to receive the input optical carrier signal; and a pair of diverging output waveguides 8 branching off from the input waveguide 7; and
a pair of output waveguides 9, which are optically connected to corresponding output waveguides 8 of the beam splitter 6, and which are arranged so mutually spaced apart as to result in them being mutually optically coupled; and
an output section 10 including:
a pair of diverging input waveguides 11, which are connected to corresponding output waveguides 9 of the input section 5, and which are formed to extend as to increase their mutual distance up to such a mutual spacing as to result in them being mutually optically uncoupled; and, optionally
a pair of output waveguides 12, which are optically connected between corresponding input waveguides 11 and corresponding optical outputs OUT1 and OUT2, and are hence arranged so mutually spaced apart as to result in them being mutually optically uncoupled.

Conveniently, the input waveguide 7 of the beam splitter 6, the output waveguides 9 of the input section 5, and the output waveguides 12 of the output section 10 are formed to extend straightly; the output waveguides 9 of the input section 5 are formed to extend parallel to each other and, preferably, to the input waveguide 7 of the beam splitter 6 and to the output waveguides 12 of the output section 10; and the output waveguides 8 of the beam splitter 6 and the input waveguides 11 of the output section 10 are formed to extend curvedly.

It is believed to be expedient to draw the reader's attention to the objective technical meaning which is intended to be attributed to the expressions "mutually optically coupled" and "mutually optically uncoupled" used, respectively, to define the degree of mutual optical coupling between the output waveguides 9 of the input section 5 and between the output waveguides 12 of the output section 10. In particular, the expression "mutually optically uncoupled" is meant to indicate to the skilled reader that no optical coupling is purposely attained between the output waveguides 12 of the output section 10, in the sense that any existing optical coupling between the output waveguides 12 is only a residual, spurious effect which results in the performance (e.g. extinction ratio) of the EOSSBM 1 being degraded, while the expression "mutually optically coupled" is meant to indicate to the skilled reader that an appropriate degree of optical coupling is purposely attained between the output waveguides 9 of the input section 5 for resulting in the associated technical effect described below (generation of a single side lobe @$\omega_A=\omega_S+\Omega$ in the optical frequency spectrum of each one of the optical signals at the ends of the mutually optically coupled input waveguides 9 of the input section 5) being achieved.

Additionally, the purposely attained optical coupling degree $\kappa_{COUP}$ of the mutually optically coupled output waveguides 9 of the input section 5 is a function of the inter-waveguide spacing S via a proportionality factor $e^{-\alpha S}$, where $\alpha$ is the inverse of the distance at which the optical coupling factor reduces to a fraction 1/e of the extrapolated value at zero distance.

The electrode structure 4 is formed on the substrate 2, at the input section 5 of the bimodal optical waveguide structure 3, and includes three, spaced apart electrodes, which are formed to extend parallel to the output waveguides 9 of the input section 5, conveniently along the full length thereof, and which include:
an inner electrode 13, which is arranged between the mutually optically coupled output waveguides 9 of the input section 5; and a pair of outer electrodes 14, which are arranged outside the mutually optically coupled output waveguides 9 of the input section 5, on opposite sides of the inner electrode 13.

Conveniently, the inner and outer electrodes 13, 14 are formed to extend straightly and parallel to each other, the outer electrodes 14 are equally spaced apart with respect to the inner electrode 13, which is formed to extend along an extension direction in line with the extension direction of the input waveguide 7 of the beam splitter 6 of the input section 5.

The outer electrodes 14 are intended to be electrically grounded, while the inner electrode 13 is arranged to receive the input electrical RF modulating signal, so resulting in an RF modulating voltage being applied between the inner electrode 13 and the outer electrodes 14.

In an X-cut LiNbO$_3$ substrate 2, orientation of the crystalline structure of the substrate causes electrical and optical fields generated by the input electrical RF modulating signal and the input optical carrier signal to couple mainly along a Z crystal axis of the crystalline structure. In fact, the electro-optical effect causes the refractive index of the electro-optical substrate to change in the region where the optical waveguides are formed as a function of intensity and direction of the electrical field applied thereto. In particular, along a given spatial direction, the refractive index changes proportionally to the amplitude of the electrical field along that direction. Changes of the refractive index along the three crystal axes X, Y and Z of the electro-optical substrate may be computed by multiplying scalarly the electrical field vector by a 3×3 matrix of electro-optical coefficients. In the case of a LiNbO$_3$ crystal, among the coefficients $r_{ij}$ of the electro-optical tensor, the electro-optical coefficient having the highest value is $r_{33}$ ($\approx$30 pm/V), which relates the change of the refractive index experienced by electromagnetic waves polarized along the Z crystal axis to the component of the electrical field along the same axis. Thus, the electro-optical coupling along the other two crystal axes is negligible compared to the electro-optical coupling along the Z crystal axis.

Due to the mutual optical coupling between the output waveguides 9 of the input section 5, the input section 5 is operatively seen by the input optical carrier signal as a single optical waveguide structure which supports two distinct optical supermodes with opposite parity, known as symmetrical supermode and antisymmetrical supermode. In the absence of other phenomena, i.e., no intrinsic asymmetries and/or electrical perturbations, if an input optical carrier signal with a symmetrical optical field spatial distribution was supplied to the input section 5, only the symmetrical supermode would propagate. Therefore, only a single symmetrical supermode with the same power as that of the input optical carrier signal, refractive index $N_S$, optical frequency $\omega_S$ and optical propagation constant $\beta_S = N_S \cdot \omega_S / c$ starts propagating along the input section 5.

During propagation along the input section 5, the symmetrical supermode experiences the afore-mentioned changes of the refractive index due to the electric field applied to the optical waveguides in the electro-optical substrate.

This experience results in the energy of the symmetrical supermode, which is the basic or zero-order optical supermode, being transferred at least partially to the antisymmetrical supermode, which is an excited optical supermode, and which starts propagating in addition to the symmetrical supermode, wherein, due to a non-linear interaction between the optical carrier signal propagating in the symmetric supermode and the electrical RF modulating signal, the induced antisymmetrical supermode has a frequency $\omega_A$ equal to the frequency $\omega_S$ of the symmetric supermode up-shifted of the frequency $\Omega$ of the electrical RF modulating signal applied to the inner electrical electrode, namely $\omega_A = \omega_S + \Omega$.

The necessary condition, known as Phase Matching condition and ascribable to the general momentum conservation principle, for this frequency change and modal transfer to occur at the same time is that the optical propagation constant $\beta_A$ of the antisymmetrical mode, which is equal to $N_A \cdot \omega_A / c$, be equal to the sum of the optical propagation constant $\beta_S$ of the symmetrical supermode and the electrical propagation constant $\beta_\Omega$ of the electrical RF modulating signal applied to the inner electrical electrode 13, namely $\beta_A = \beta_S + \beta_\Omega$), wherein $\beta_\Omega = N_\Omega \cdot \omega_\Omega / c$ and $N_\Omega$ is the refractive index of the electrical RF modulating signal propagating along the inner electrode 13.

As a result, at the ends of the mutually optically coupled output waveguides 9 of the input section 5, both the residual symmetrical supermode and the antisymmetrical supermode are present, each having part of the optical power of the input optical carrier signal, wherein the symmetrical supermode with two lobes equal in amplitude and sign is at frequency $\omega_S$, while the antisymmetrical supermode with two lobes equal in amplitude but opposite in sign is at frequency $\omega_A$.

Attention is drawn to the fact that, from a practical standpoint, the electrical RF modulating signal is not large enough to induce complete "depletion" of the input optical carrier signal by complete transfer of input energy into the shifted carrier. Thus a residual frequency-unshifted optical carrier signal remains in the output optical signal while power in the shifted lobe is linearly related to the input RF modulating power ($P_{SHIFTED} \propto P_\Omega$) which is the expected behavior in an optical modulator.

It should also be noted that the refractive index $N_S$ of the symmetrical supermode is higher than that of the antisymmetrical mode $N_S$, and this results in $\beta_A < \beta_S$. This condition, combined with the above-mentioned Phase Matching condition $\beta_A = \beta_S + \beta_\Omega$, results in $\beta_\Omega < 0$, which technically means that, in order for the Phase Matching condition to be met, the electrical RF modulating signal is to be supplied to the inner electrode 13 so as to propagate along the inner electrode 13 in a propagation direction opposite to the propagation direction of the optical carrier signal along the mutually optically coupled output waveguides 9 of the input section 5.

Finally, the two composed optical signals, namely the symmetrical mode at optical frequency $\omega_S$ and the antisymmetrical mode at optical frequency $\omega_A$, present at the end of the mutually optically coupled output waveguides 9 of the input section 5, are supplied to the input waveguides 11 of the output section 10, the increasing mutual spacing thereof along the propagation direction of the composed optical signals results in the two lobes of each composed optical signal being spatially separated, so that only modes spatially shaped as single lobes are supplied to the output waveguides 12 of the output section 10.

When compared to the EOSSBMs in the prior art, the advantages of EOSSBM according to the present invention may be easily appreciated:

the optical pattern is much simpler and includes shorter optical paths and a lower number of Y junctions, so resulting in lower optical losses;

no external DC bias signal is needed to bring the EOSSBM in the appropriate operating point, so resulting in no need of external electronic components (Bias Control Loops) to stabilize the DC bias signal at the correct value; and no signal pre-processing ($\pi/2$ phase shifting) is needed for the input electric RF modulating signal, which is supplied to RF electrode structure as it is, so resulting in no need of electronic signal processing components.

In particular, when compared to the frequency shifter disclosed in U.S. Pat. No. 5,022,731, the EOSSBM according to the present invention has several advantages. In detail, the optical architecture is quite simpler as it only comprises a single Y junction and two coupled waveguides. No further recombination which implies optical losses and instability due to optical interference. Also no DC bias is needed in our case, which usually calls for external electronics to countermeasure voltage drift effects. Furthermore, it should also be appreciated that in the frequency shifter disclosed in U.S. Pat. No. 5,022,731, the optical recombination after n phase shift in the DC section driven by V0 voltage degrades power efficiency of the modulation as half power undergoes destructive interference. On the other hand, in the present invention all power is delivered at the end of the device, half at each of the two outputs, available for multiple uses, e.g. for communication and monitoring, etc.

Moreover, the EOSSBM according to the present invention outputs two SSB modulated optical signals, which may be used for monitoring, parallel signal distribution, etc.

In the end, it is clear that modifications and variants can be made to the present invention, all falling within the scope of the invention, as defined in the appended claims.

In particular, the skilled reader's attention is drawn to the fact that the teachings on which the present invention is based have proven to be valid also when different types of optical modes from those described above, for example in terms of optical field spatial distribution and/or polarization, are exploited, on condition that the optical propagation constants of the optical modes and the electrical propagation constant of the electrical modulating signal meet the aforementioned Phase Matching condition, according to which the optical propagation constant of a first one of the optical modes is equal to the sum of the optical propagation constant of a second one of the optical modes and the electrical propagation constant $\beta_\Omega$ of the electrical modulating signal, so resulting in the energy of the first optical mode being transferred at least partially to the second optical mode, and, as a consequence, in the optical frequency of the second optical mode being equal to the optical frequency of the first optical mode up-shifted of the electrical frequency $\Omega$ of the electrical modulating signal.

The invention claimed is:

1. An electro-optical single-sideband modulator (1) comprising:
   an optical input (IN) to receive an input optical carrier signal having an optical frequency ($\omega_S$), and a pair of optical outputs (OUT1, OUT2) to output corresponding SSB modulated optical signals, each having an optical frequency spectrum with a single side lobe;
   an electro-optical substrate (2);
   a bimodal optical waveguide structure (3) formed in the substrate (2) to support different optical modes having associated optical frequencies ($\omega_S$, $\omega_A$) and optical propagation constants ($\beta_S$, $\beta_A$), and coupled between the optical input (IN) and the optical outputs (OUT1, OUT2) of the electro-optical single-sideband modulator (1) to receive the input optical carrier signal and responsively generate the SSB modulated optical signals; and
   an electrode structure (4) formed on the substrate (2) to receive an input electrical modulating signal having an associated electrical frequency ($\Omega$) and electrical propagation constant ($\beta_\Omega$), and to responsively apply an electrical field to the bimodal optical waveguide structure (3);
   wherein the bimodal optical waveguide structure (3) and the electrode structure (4) are so formed that the optical propagation constants ($\beta_S$, $\beta_A$) of the optical modes and the electrical propagation constant ($\beta_\Omega$) of the electrical modulating signal meet a Phase Matching condition, according to which the optical propagation constant ($\beta_A$) of a first one of the optical modes is equal to the sum of the optical propagation constant ($\beta_S$) of a second one of the optical modes and the electrical propagation constant ($\beta_\Omega$) of the electrical modulating signal, so resulting in the energy of the first optical mode being transferred at least partially to the second optical mode, and, as a consequence, in the optical frequency ($\omega_A$) of the second optical mode being equal to the optical frequency ($\omega_S$) of the first optical mode up-shifted of the electrical frequency ($\Omega$) of the electrical modulating signal, and the SSB modulated optical signals are outputted externally to the single-sideband modulator separately through the optical outputs (OUT1, OUT2) without interfering with one another.

2. The electro-optical single-sideband modulator of claim 1, wherein the bimodal waveguide structure (3) includes an input section (5) and an output section (10);
   wherein the input section (5) includes:
   a beam splitter (6), which is in the form of an Y junction, and which includes an input waveguide (7) connected to the optical input (IN) to receive the input optical carrier signal, and a pair of diverging output waveguides (8) branching off from the input waveguide (7); and
   a pair of output waveguides (9), which are optically connected to corresponding output waveguides (8) of the beam splitter (6), and which are arranged so mutually spaced apart as to result in them being mutually optically coupled;
   wherein the output section (10) includes:
   a pair of diverging input waveguides (11), which are connected between corresponding output waveguides (9) of the input section (5) and corresponding optical outputs (OUT1, OUT2), and which are formed to extend as increase their mutual distance up to such a mutual spacing as to result in them being mutually optically uncoupled;
   and wherein the electrode structure (4) includes three spaced apart electrodes (13, 14), which are formed to extend parallel to the output waveguides (9) of the input section (5), and which include an inner electrode (13) arranged between the output waveguides (9) of the input section (5) to receive the input electrical modulating signal, and two outer electrodes (14), which are arranged outside the output waveguides (9) of the input section (5), on opposite sides of the inner electrode (13), and which are intended to be biased at a reference electrical potential.

3. The electro-optical single-sideband modulator of claim 2, wherein the input optical carrier signal and the input electrical modulating signal are so supplied to the bimodal optical waveguide structure (3) and, respectively, to the electrode structure (4) as to propagate in opposite propagation directions along the input waveguides (9) of the input section (5) of the bimodal optical waveguide structure (3) and, respectively, along the inner electrode (13) of the electrode structure (4).

4. The electro-optical single-sideband modulator of claim 2, wherein the output waveguides (9) of the input section (5) are formed to extend straightly and parallel to each other.

5. The electro-optical single-sideband modulator of claim 4, wherein the input waveguide (7) of the beam splitter (6) is formed to extend straightly and parallel to the output waveguides (9) of the input section (5).

6. The electro-optical single-sideband modulator of claim 4, wherein the inner and outer electrodes (13, 14) are formed to extend straightly.

7. The electro-optical single-sideband modulator of claim 2, wherein the output section (10) of the optical waveguide structure (3) further includes a pair of output waveguides (12), which are optically connected between corresponding input waveguides (11) of the output section (10) and corresponding optical outputs (OUT1, OUT2).

8. The electro-optical single-sideband modulator of claim 7, wherein the output waveguides (12) of the output section (10) are formed to extend straightly and parallel to each other, to the input waveguide (7) of the beam splitter (6), to the output waveguides (9) of the input section (5), and to the inner and outer electrodes (13, 14).

9. A method of operating an electro-optical single-sideband modulator of claim 1, comprising:
  supplying the input optical carrier signal and the input electrical modulating signal to the bimodal optical waveguide structure (3) and, respectively, to the electrode structure (4) such that they propagate in opposite propagation directions along the input waveguides (9) of the input section (5) of the bimodal optical waveguide structure (3) and, respectively, along the inner electrode (13) of the electrode structure (4).

* * * * *